Patented May 21, 1935

2,002,053

UNITED STATES PATENT OFFICE 2,002,053

CORN PRODUCT AND METHOD OF MAKING THE SAME

Charles Elmer Doolin, San Antonio, Tex.

No Drawing. Application August 24, 1934,
Serial No. 741,335

2 Claims. (Cl. 99—11)

My invention relates generally to the art of preparing corn for human consumption and particularly to a new and novel method of preparing corn of the type which is used in the making of Mexican tortillas, and to the product resulting therefrom, and an important object of the invention is to provide a highly appetizing and nutritious corn product of crisp and easily digestible form which is to be eaten without further cooking.

Another important object of the invention is to prepare and provide a product of the character indicated which is attractive in appearance and is suitable to be sold and dispensed in packages in the same manner and to the same purpose as packaged nuts, confections, and potato chips are packaged and vended.

Another important object of the invention is to provide a product of the character indicated above in the process of making of which a new and novel cooking step is employed which results in superior crispness and flavor.

Other objects and advantages of my invention will be apparent from a reading of the following description, wherein for purposes of illustration I have set forth a preferred embodiment of the invention.

The preparation of Mexican tortillas is characterized by the dropping of precooked corn form in hot oil so as to fry and crisp the same, so that the prebaked tortilla is in effect subjected to a second cooking to impart thereto the desired crispness, flavor, and characteristic form. The present invention obtains superior crispness, superior flavor, and a more attractive form and distinctive taste and edible characteristics, by a step of immersion of the prepared but uncooked dough in hot oil. The result is a product of superior characteristics which readily distinguish the same from the products of the priorly known processes by its greater crispness, better flavor, greater digestibility and suitability of form for vending in paper bags, wherein the product is subject to a certain amount of deteriorative action by the elements.

Another respect in which the present invention differs from the conventional method of preparing Mexican tortillas lies in the fact that in accordance with the present process water is mixed with the corn at the time the corn is being ground into the corn dough. The conventional method of preparing tortillas does not involve the mixing of water with the corn at the time it is being ground, and the result of so doing, coupled with the single cooking of the dough by immersion in the hot oil, brings about the novel form and character of the product of the invention.

The process of the invention involves:—

(1) Softening and soaking the hull of the corn in water to which has been added from 4 to 6 ounces of lime to each 100 pounds of whole grain corn. The amount of lime to be added to the water depends upon the hardness of the water. The corn being covered with the water and lime solution is placed on the fire until the same boils, when the same is removed from the fire and permitted to steep in the same water for a period of from 8 to 12 hours. In some instances it will be found advisable or necessary to cool the solution at the time of removing the same from the fire in order to prevent fermentation.

(2) After the corn has been soaked as indicated above, the corn is washed free from the gluten and shell and then placed in a grinding mill where, as the shelled corn is being ground, water is added to the corn, in an amount to produce the desired consistency of the dough.

The dough prepared as above is then place in a suitable press and cutter and forced therethrough so as to form strips or ribbons, which drop by arrangement into hot oil which cooks the ribbons or chips. The temperature of the oil ranges from 375 to 400 degrees F., and the ribbons or chips are permitted to cook or fry therein until slightly brown.

The resulting product in the ribbon or chip form is more crisp, more tender, and more palatable than any similar products, especially those which are made by prebaking as in the case of tortillas and then cooking the tortillas in oil. The fried chips or strips may be salted if desired.

Although I have shown and described herein a preferred embodiment of the invention, it is to be definitely understood that I do not desire to limit the application of the invention thereto, but any change or changes may be made in the materials used, and in the sequence and duration of steps and operations, within the spirit of the invention and the scope of the subjoined claims.

What is claimed is:—

1. A method of making a product of the character described comprising taking shelled corn, grinding the shelled corn while adding water thereto thereby forming a dough, then extruding and cutting the undried dough into strips or chips, and dropping the chips or strips into hot oil so as to fry the same to a crisp condition.

2. In a process of the character described the steps of grinding the corn while adding water thereto thereby forming a dough, then forming the dough into strips, and dropping the strips directly into hot oil so as to fry the same.

CHARLES ELMER DOOLIN.